(No Model.)
F. A. M. WESTHEIMER.
TOASTING IRON OR TONGS.
No. 489,056.  Patented Jan. 3, 1893.
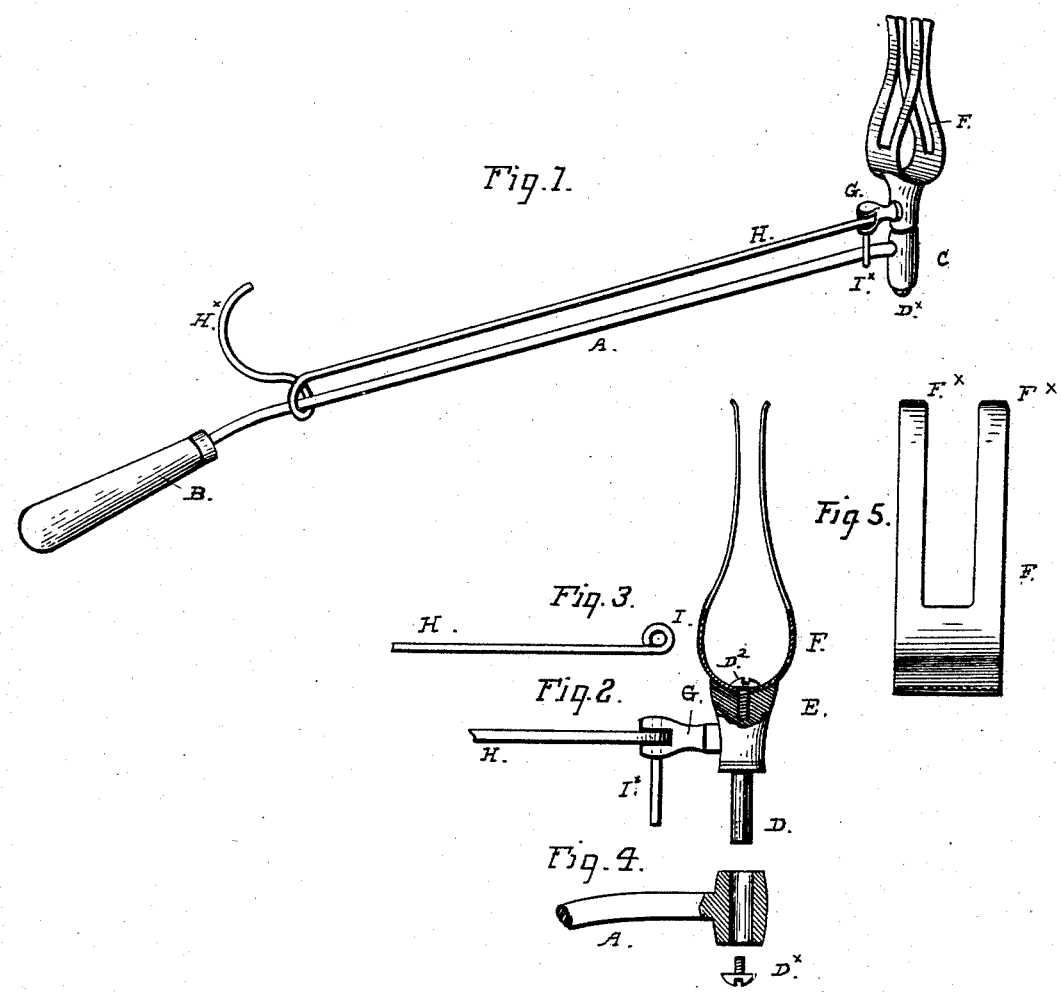

UNITED STATES PATENT OFFICE.

FERDINAND A. M. WESTHEIMER, OF SAN FRANCISCO, CALIFORNIA.

TOASTING IRON OR TONGS.

SPECIFICATION forming part of Letters Patent No. 489,056, dated January 3, 1893.

Application filed March 9, 1892. Serial No. 424,353. (No model.)

*To all whom it may concern:*

Be it known that I, FERDINAND A. M. WESTHEIMER, a citizen of the United States, residing at San Francisco, in the county of San Francisco and State of California, have invented a new and useful Toasting Iron or Tongs, of which the following is a specification.

My invention relates to a device for toasting bread and other articles of food, and it consists in a bent arm provided with a suitable handle at one end and a hollow thimble at the other or fine end in which a spindle carrying a rack or bread-holding device operates by means of a wrist pin joint connecting with a rod which slides forward and backward on the bent arm causing the rack or bread holder to change positions from front to rear at the will of the operator.

The object of my invention is to produce a device whereby both sides of the bread or other article of food can be presented alternately to the fire without the necessity of removing it from the holder or clamp.

I accomplish the object by the means or device illustrated in the accompanying drawings, which form part of this specification and in which:—

Figure 1 is a perspective view of my improved toasting iron or tongs Fig. 2 is a side view of a portion of my improved toasting device partly in section. Figs. 3, 4 and 5 are detail views of different parts of the toasting device.

A is the arm bent near the upper end, in about the manner shown to give the requisite pitch to the implement, with a suitable handle B.

To the opposite end of the bent arm is connected a thimble C carrying a vertical hollow threaded spindle D, which is held in relative position with the fixed thimble at the lower end by the set screw $D^\times$. The upper end of this spindle is made concave as at E, to form a seat for the lower end of the spring clamp of bread holder F, the latter being bent rounding to fit down upon the concavity of the spindle, in which position it is held down by the set screw $D^2$.

From the spindle D extends a horizontal slotted or split arm G, in which the end of the sliding rod H, having a loop I operates, and a pin $I^\times$ passes through the split arm and loop forming a wrist pin joint and pivoting the sliding arm to the split arm as shown. The pin $I^\times$ extends downward below the line of the bent arm and forms a stop as the spindle D, carrying the holder is moved from right to left, or left to right, to present both faces of the holder in an alternate manner to the fire, while the rod H, extends backward and parallel along the line of the bent arm, the end of which is looped around the rod and formed into a tang $H^\times$ for the fingers, as shown.

The holder or rack F is made of spring steel and may be composed of two or more prongs or holding points $F^\times F^\times$ to expose as much of the surface of the article to the action of the fire as possible.

In practice the bread is placed in the rack and the operating rod which connects with the part G moved forward and backward upon the bent arm, presenting both surfaces of the article to the fire in an alternate manner.

Having thus fully described my invention, what I claim and desire to secure by Letters Patent, is:—

1. In a toasting iron or tongs of the character described, a bent arm or handle, thimble secured to the end thereof, spindle working therein, clamp or holder secured to said spindle, a split arm also secured to said spindle, and a supplemental rod pivoted in said split arm and sliding on the bent arm or handle, as and for the purpose set forth.

2. In a toasting iron or tongs the thimble at the end of the bent arm, a spindle carrying the clamp or holder operating in the thimble and a supplemental rod sliding on the bent arm and connected to the hollow spindle, as described.

3. In a toasting iron or tongs of the character above described the holding spring clamp or rack connected to the top of the hollow spindle at the end of a bent arm, a split arm projecting from said spindle in which a supplemental rod sliding on the bent arm is pivoted by a pin, for operating the spindle and rack in the manner above described.

In testimony that I claim the foregoing I have hereunto set my hand and seal.

FERDINAND A. M. WESTHEIMER. [L. S.]

Witnesses:
  C. W. M. SMITH,
  S. B. ISAACS.